(12) United States Patent
Medvedev et al.

(10) Patent No.: US 7,822,069 B2
(45) Date of Patent: Oct. 26, 2010

(54) PHASE CORRECTION FOR OFDM AND MIMO TRANSMISSIONS

(75) Inventors: Irina Medvedev, Somerville, MA (US); Jay Rodney Walton, Carlisle, MA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 11/751,471

(22) Filed: May 21, 2007

(65) Prior Publication Data

US 2008/0056305 A1    Mar. 6, 2008

Related U.S. Application Data

(60) Provisional application No. 60/802,632, filed on May 22, 2006.

(51) Int. Cl.
*H04B 3/10* (2006.01)
*H04W 4/00* (2009.01)

(52) U.S. Cl. ........................................ 370/491; 370/338

(58) Field of Classification Search ................. 370/491, 370/203, 204, 206, 252, 334, 338, 350, 516, 370/522
See application file for complete search history.

(56) References Cited

U.S. PATENT DOCUMENTS

| | | | |
|---|---|---|---|
| 7,031,405 | B1 | 4/2006 | Touzni et al. |
| 7,106,709 | B2 | 9/2006 | Davidsson et al. |
| 2003/0128660 | A1* | 7/2003 | Ito et al. ........... 370/210 |
| 2004/0071234 | A1 | 4/2004 | Li |
| 2005/0084000 | A1* | 4/2005 | Krauss et al. ........... 375/148 |

(Continued)

FOREIGN PATENT DOCUMENTS

EP    1158739    11/2001

(Continued)

OTHER PUBLICATIONS

International Search Report—PCT/US2007/069501—International Search Authority, European Patent Office, May 28, 2008.

(Continued)

*Primary Examiner*—Brian D Nguyen
(74) *Attorney, Agent, or Firm*—Michael J. Dehaemer, Jr.

(57) ABSTRACT

Techniques for performing phase correction for wireless communication are described. Received pilot symbols and received data symbols may be obtained from an orthogonal frequency division multiplexing (OFDM) and/or multiple-input multiple-output (MIMO) transmission. First phase information is obtained based upon the received pilot symbols. Second phase information is obtained based upon the received data symbols. The phase of the received data symbols is corrected based upon the first and second phase information (directly and/or indirectly). For example, the phase of the received data symbols may be corrected based upon the first phase information, detection may be performed on the phase corrected data symbols to obtain estimated data symbols, the second phase information may be obtained based upon the estimated data symbols, and the phase of the estimated data symbols may be corrected based upon the second phase information. The phase correction may also be performed in other manners.

33 Claims, 10 Drawing Sheets

U.S. PATENT DOCUMENTS

| | | |
|---|---|---|
| 2006/0078070 A1 | 4/2006 | Zhidkov et al. |
| 2006/0128326 A1* | 6/2006 | Pietraski ............... 455/130 |
| 2007/0019748 A1* | 1/2007 | Hoo et al. .............. 375/260 |

FOREIGN PATENT DOCUMENTS

| | | |
|---|---|---|
| EP | 1162803 | 12/2001 |
| EP | 1580949 | 9/2005 |
| WO | 0228046 | 4/2002 |
| WO | 0241518 | 5/2002 |
| WO | 02058250 | 7/2002 |
| WO | 2006039550 | 4/2006 |
| WO | 2006049628 | 5/2006 |

OTHER PUBLICATIONS

Come B, et al.: "Compensation of IQ Imbalance and Phase Noise in OFDM Systems," IEEE Transactions on Wireless Communications, vol. 4, No. 3, May 2005, pp. 872-877; XP011131416.

Yi-Hsin, Y. et al.: "A Joint Scheme of Decision-Directed Channel Estimation and Weighted-Average Phase Error Tracking for ODFM WLAN Systems" Proceedings of the IEEE Asia-Pacific Conference on Circuits and Systems, vol. 2, Dec. 6, 2004, pp. 985-988; XP010783396.

* cited by examiner

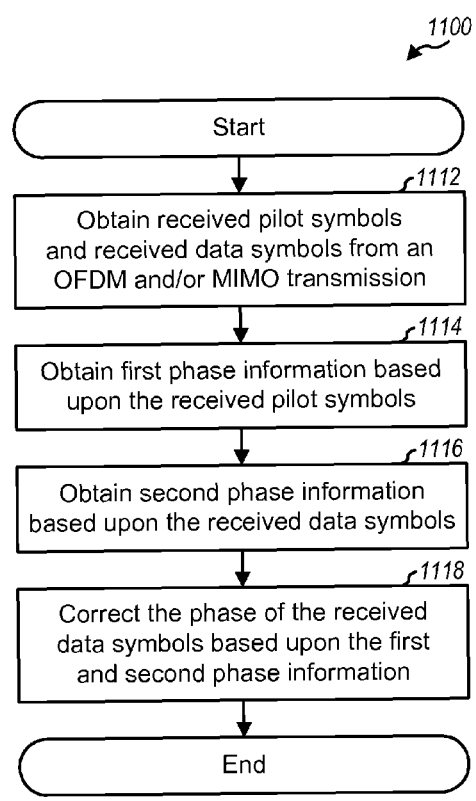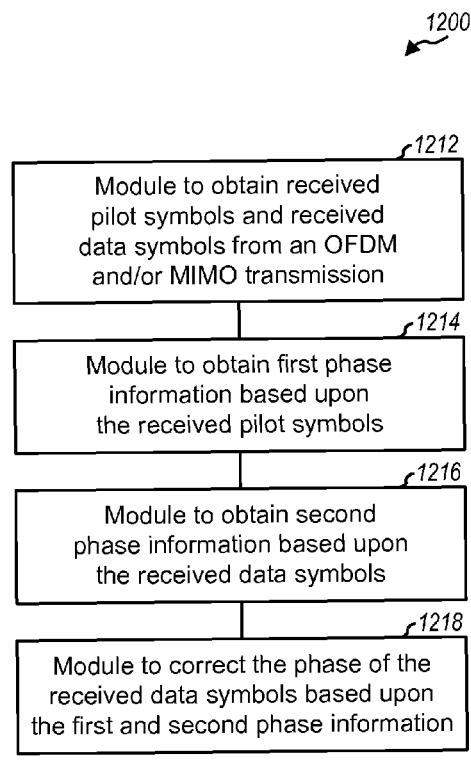
FIG. 11
FIG. 12

PHASE CORRECTION FOR OFDM AND MIMO TRANSMISSIONS

The present application claims priority to provisional U.S. Application Ser. No. 60/802,632 entitled "DECISION-DIRECTED PHASE CORRECTION FOR SISO AND MIMO OFDM SYSTEMS," filed May 22, 2006, assigned to the assignee hereof and incorporated herein by reference.

BACKGROUND

I. Field

The present disclosure relates generally to communication, and more specifically to techniques for performing phase correction for wireless communication.

II. Background

In a wireless communication system, a transmitter typically processes (e.g., encodes and modulates) traffic data to generate data symbols. For a coherent system, the transmitter multiplexes pilot symbols with the data symbols, processes the multiplexed data and pilot symbols to generate a radio frequency (RF) signal, and transmits the RF signal via a wireless channel. The wireless channel distorts the transmitted RF signal with a channel response and further degrades the signal with noise and interference.

A receiver receives the transmitted RF signal and processes the received RF signal to obtain samples. For coherent detection, the receiver estimates the response of the wireless channel based upon the received pilot and derives a channel estimate. The receiver then performs detection with the channel estimate to obtain estimated data symbols, which are estimates of the data symbols sent by the transmitter. The receiver then processes (e.g., demodulates and decodes) the estimated data symbols to obtain decoded data.

The receiver typically estimates frequency error at the receiver. This frequency error may be due to difference in oscillator frequencies at the transmitter and receiver, Doppler shift, and so on. The receiver may remove the frequency error from the samples and then perform detection on the frequency corrected samples. However, there is typically residual error in the frequency error estimate. This residual error results in phase error in the frequency corrected samples, and the phase error may degrade performance.

There is therefore a need in the art for techniques to perform phase correction for wireless communication.

SUMMARY

Techniques for performing phase correction for wireless communication are described herein. In an aspect, received pilot symbols and received data symbols are obtained from an orthogonal frequency division multiplexing (OFDM) and/or multiple-input multiple-output (MIMO) transmission. First phase information is obtained based upon the received pilot symbols. Second phase information is obtained based upon the received data symbols. The first and second phase information may be obtained in various manners and represented in various forms. The phase of the received data symbols is corrected based upon the first and second phase information. The phase correction may use the first and second phase information directly and/or indirectly and may be performed in one or more steps.

To obtain the first phase information, the phase of the received pilot symbols may be corrected by an initial phase error, which may be the phase error for a prior symbol period, zero, or some other value. Detection may be performed on the phase corrected pilot symbols to obtain estimated pilot symbols. Dot products of the estimated pilot symbols and known pilot symbols may be computed, weighted by signal-to-noise ratio (SNR) estimates for different subcarriers and/or streams, and combined to obtain the first phase information. To obtain the second phase information, the phase of the received data symbols may be corrected by the first phase information. Detection may be performed on the phase corrected data symbols to obtain estimated data symbols. Hard decisions may be obtained for the estimated data symbols. Dot products of the estimated data symbols and the hard decisions may be computed, weighted by scaling factors that may be dependent on SNR and/or other factors, and combined to obtain the second phase information. The first and second phase information may also be obtained in other manners.

The phase correction may be performed in various manners. In one scheme, the phase of the received pilot symbols is corrected (e.g., based upon the second phase information from a prior symbol period), the first phase information is obtained based upon the phase corrected pilot symbols, and the phase of the received data symbols is corrected based upon the first phase information. In another scheme, the phase of the received data symbols is corrected based upon the first phase information, detection is performed on the phase corrected data symbols to obtain estimated data symbols, the second phase information is obtained based upon the estimated data symbols, and the phase of the estimated data symbols is corrected based upon the second phase information. In yet another scheme, the first and second phase information is combined to obtain combined phase information, and the phase of the received data symbols is corrected based upon the combined phase information. The phase correction may also be performed in other manners.

Various aspects and features of the disclosure are described in further detail below.

BRIEF DESCRIPTION OF THE DRAWINGS

FIG. 11 shows a generic process for performing phase correction.

FIG. 12 shows an apparatus for performing phase correction.

DETAILED DESCRIPTION

The phase correction techniques described herein may be used for various communication networks such as wireless wide area networks (WWANs), wireless metropolitan area networks (WMANs), wireless local area networks (WLANs), and wireless personal area networks (WPANs). The terms "networks" and "systems" are often used interchangeably. These wireless networks may use Code Division Multiple Access (CDMA), Frequency Division Multiple Access (FDMA), Time Division Multiple Access (TDMA), Spatial Division Multiple Access (SDMA), Orthogonal FDMA (OFDMA), Single-Carrier FDMA (SC-FDMA), and/or some other multiple access schemes. OFDMA utilizes OFDM. SC-FDMA utilizes single-carrier frequency division multiplexing (SC-FDM). OFDM and SC-FDM partition the system bandwidth into multiple (K) orthogonal subcarriers, which are also referred to as tones, bins, and so on. Each subcarrier may be modulated with data. In general, modulation symbols are sent in the frequency domain with OFDM and in the time domain with SC-FDM. For clarity, the techniques are described for an OFDM-based system that utilizes OFDM.

The techniques may also be used for single-input single-output (SISO), single-input multiple-output (SIMO), multiple-input single-output (MISO), and multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. The techniques may also be used for various modulation schemes such as M-ary phase shift keying (M-PSK) and M-ary quadrature amplitude modulation (M-QAM).

Figure 1:
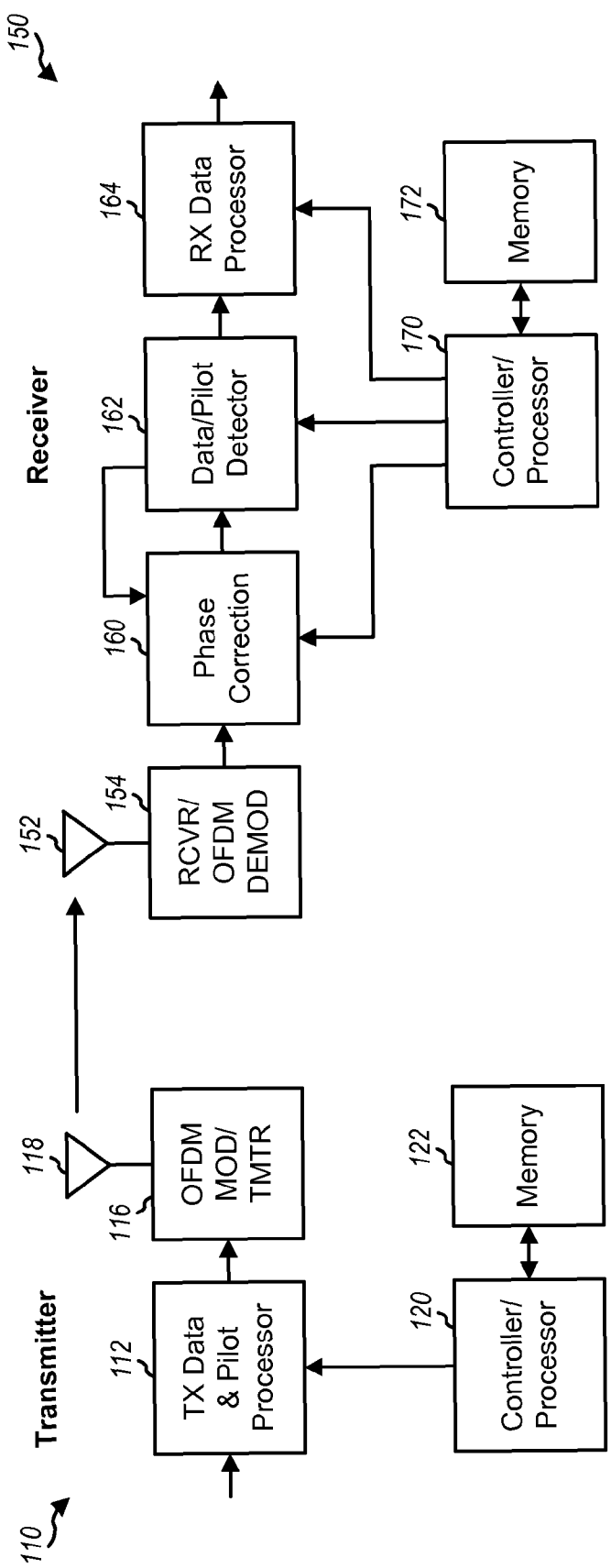
FIG. 1 shows a transmitter and a receiver for a SISO transmission.

FIG. 1 shows a block diagram of a transmitter 110 and a receiver 150 for a SISO transmission. For the downlink (or forward link), transmitter 110 may be part of a base station, an access point, a Node B, and/or some other network entity. Receiver 150 may be part of a terminal, a station, a mobile station, a user equipment, a subscriber unit, and/or some other device. For the uplink (or reverse link), transmitter 110 may be part of a terminal, a station, a mobile station, a user equipment, and so on, and receiver 150 may be part of a base station, an access point, a Node B, and so on.

At transmitter 110, a transmit (TX) data and pilot processor 112 processes (e.g., encodes, interleaves, and symbol maps) traffic data to generate data symbols. Processor 112 also generates pilot symbols and further multiplexes the pilot symbols with data symbols. As used herein, a data symbol is a symbol for data, a pilot symbol is a symbol for pilot, and a symbol is typically a complex value. A data symbol or a pilot symbol may be sent on one subcarrier in one symbol period. The data symbols and pilot symbols may be modulation symbols from a modulation scheme such as PSK or QAM. The pilot symbols are known a priori by both a transmitter and a receiver and may be used to generate short and long training symbols and other types of pilot, as described below. An OFDM modulator/transmitter (OFDM MOD/TMTR) 116 performs OFDM modulation on the data symbols and pilot symbols to obtain output chips. Transmitter 116 further processes (e.g., converts to analog, filters, amplifies, and upconverts) the output chips and generates a modulated signal, which is transmitted from an antenna 118.

At receiver 150, an antenna 152 receives the modulated signal from transmitter 110 and provides a received signal. A receiver/OFDM demodulator (RCVR/OFDM DEMOD) 154 processes (e.g., filters, amplifies, downconverts, digitizes) the received signal to obtain samples, estimates and removes frequency error at receiver 150, and further performs OFDM demodulation on the samples to obtain received symbols for all subcarriers of interest. A phase correction unit 160 obtains the received symbols, estimates phase error in each symbol period, removes the phase error, and provides phase-corrected symbols. The terms "error" and "offset" are often used interchangeably with regard to frequency and phase. A detector 162 performs detection (e.g., matched filtering or equalization) on the phase-corrected symbols and provides estimated pilot and data symbols. Phase correction unit 160 may estimate the phase error based upon the received symbols and/or the estimated symbols. An RX data processor 164 processes (e.g., deinterleaves and decodes) the estimated data symbols and provides decoded data. Processor 164 may calculate log-likelihood ratios (LLRs) for code bits based upon the estimated data symbols and further deinterleaves and decodes the LLRs to obtain the decoded data.

Controllers/processors 120 and 170 direct the operation at transmitter 110 and receiver 150, respectively. Memories 122 and 172 store data and program codes for transmitter 110 and receiver 150, respectively.

Figure 2:
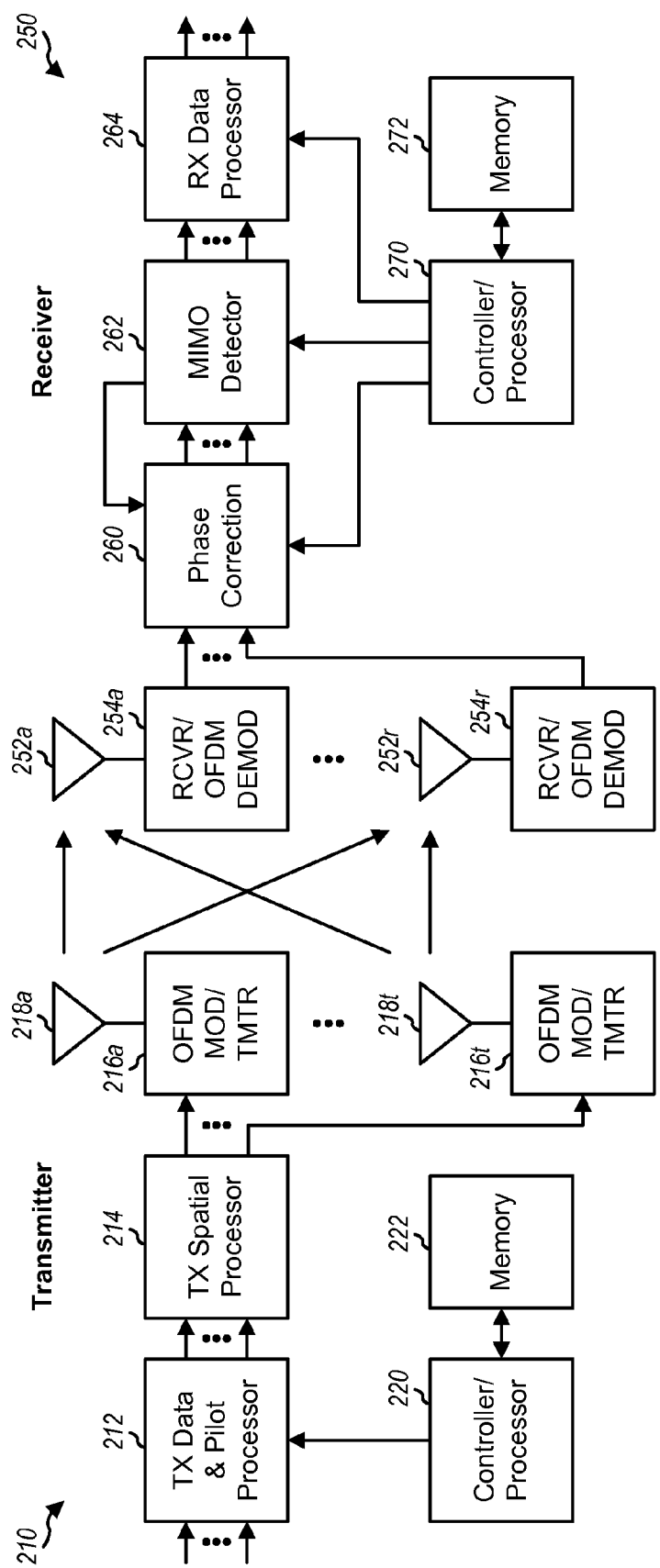
FIG. 2 shows a transmitter and a receiver for a MIMO transmission.

FIG. 2 shows a block diagram of a transmitter 210 and a receiver 250 for a MIMO transmission. Transmitter 210 is equipped with multiple (T) antennas, and receiver 250 is equipped with multiple (R) antennas. Each transmit antenna and each receive antenna may be a physical antenna or an antenna array.

At transmitter 210, a TX data and pilot processor 212 processes traffic data to generate data symbols, processes pilot to generate pilot symbols, and multiplexes the pilot symbols with data symbols. A TX spatial processor 214 performs transmitter spatial processing on the data and pilot symbols and provides T output symbol streams to T OFDM modulators/transmitters 216a through 216t. TX spatial processor 214 may perform direct MIMO mapping, spatial spreading, transmit beamforming, etc. Each data symbol and each pilot symbol may be sent from one antenna (for direct mapping) or multiple antennas (for spatial spreading and beamforming). Each OFDM modulator/transmitter 216 performs OFDM modulation on its output symbols to generate output chips and further processes the output chips to generate a modulated signal. T modulated signals from transmitters 216a through 216t are transmitted from antennas 218a through 218t, respectively.

At receiver 250, R antennas 252a through 252r receive the T modulated signals from transmitter 210, and each antenna 252 provides a received signal to a respective receiver/OFDM demodulator 254. Each receiver/OFDM demodulator 254 processes its received signal to obtain samples, estimates and removes frequency error at receiver 250, and further performs OFDM demodulation on the samples to obtain received symbols. A phase correction unit 260 processes the received symbols from OFDM demodulators 254a through 254r, estimates and removes phase error in each symbol period, and provides phase-corrected symbols. A MIMO detector 262 performs MIMO detection on the phase-corrected symbols and provides estimated pilot and data symbols. MIMO detector 262 may implement minimum mean square error (MMSE), zero-forcing (ZF), successive interference cancellation (SIC), or some other MIMO detection technique. Phase correction unit 260 may estimate the phase error based upon the received symbols and/or the estimated symbols. An RX data processor 264 processes the estimated data symbols and provides decoded data.

Controllers/processors 220 and 270 direct the operation at transmitter 210 and receiver 250, respectively. Memories 222 and 272 store data and program codes for transmitter 210 and receiver 250, respectively.

In an OFDM-based system, an OFDM symbol may contain data symbols on data subcarriers and/or pilot symbols on pilot subcarriers. A data subcarrier is a subcarrier used for data, and a pilot subcarrier is a subcarrier used for pilot. A phase error may be estimated by performing a dot product of an estimated symbol and its known symbol, as follows:

$$\theta = \tan^{-1}(s^* \cdot \hat{s}), \quad \text{Eq (1)}$$

where
s is a known symbol, e.g., a known pilot symbol,
ŝ an estimated symbol, e.g., an estimated pilot symbol, and
θ is the phase error between the estimated and known symbols.

In general, the estimated symbol ŝ may be an estimated pilot symbol or an estimated data symbol. The known symbol s may be a pilot symbol that is known a priori by the receiver or a hard decision of an estimated data symbol. A hard decision is typically a modulation symbol that is closest (e.g., in Euclidean distance) to the estimated data symbol.

A pilot-based phase estimate may be obtained based upon pilot symbols for symbol period n, as follows:

$$X_p(n) = \sum_{k=1}^{K_P} \sum_{m=1}^{N_P(k)} \beta_{k,m}(n) \cdot p^*_{k,m}(n) \cdot \hat{p}_{k,m}(n), \text{ and} \quad \text{Eq (2)}$$

$$\theta_p(n) = \tan^{-1}\{X_p(n)\}, \quad \text{Eq (3)}$$

where $p_{k,m}(n)$ is a known pilot symbol for stream m on subcarrier k,
$\hat{p}_{k,m}(n)$ is an estimated pilot symbol for stream m on subcarrier k,
$\beta_{k,m}(n)$ is a weighting factor for stream m on subcarrier k,
$N_P(k)$ is the number of pilot streams on subcarrier k,
$K_P$ is the number of pilot subcarriers,
$X_p(n)$ is a pilot-based phasor for symbol period n, and
$\theta_p(n)$ is a pilot-based phase error.

In equation (2), $\beta_{k,m}(n)$ represents the weight given to each estimated pilot symbol and may be determined based upon SNR, some other indication of received signal quality, and/or other factors. $\beta_{k,m}(n)$ may also be set to 1 to give equal weight to all estimated pilot symbols. $X_p(n)$ is equal to a weighted sum of the dot products of the estimated pilot symbols and the known pilot symbols. $X_p(n)$ contains the weighted average phase error between the estimated pilot symbols and the known pilot symbols.

In a SISO transmission, the number of pilot streams is equal to one for all pilot subcarriers, or $N_p(k)=1$ for all k. In a MIMO transmission, the number of pilot streams may be equal to one, to the number of data streams, to the smaller of T and R, or independent of these parameters. The number of pilot streams may vary from subcarrier to subcarrier and/or from OFDM symbol to OFDM symbol.

The number of pilot symbols is typically much smaller than the number of data symbols. A phase estimate may thus be improved by using the data symbols as well as the pilot symbols. The data symbols are not known at the receiver. However, the receiver can estimate the transmitted data symbols by (1) performing detection on the received data symbols to obtain estimated data symbols and (2) making hard decisions on the estimated data symbols based upon the known data rate (and thus the signal constellation) used for the data symbols. The hard decisions may be used as the transmitted data symbols and may be compared against the estimated data symbols in the same manner as for the pilot symbols.

A data-based phase estimate may be obtained based upon the estimated data symbols for symbol period n, as follows:

$$X_d(n) = \sum_{k=1}^{K_D} \sum_{m=1}^{N_D(k)} \beta_{k,m}(n) \cdot \bar{d}^*_{k,m}(n) \cdot \hat{d}_{k,m}(n), \text{ and} \quad \text{Eq (4)}$$

-continued $$\theta_d(n) = \tan^{-1}\{X_d(n)\}, \quad \text{Eq (5)}$$

where $\hat{d}_{k,m}(n)$ is an estimated data symbol for stream m on subcarrier k,
$\bar{d}_{k,m}(n)$ is a hard decision for estimated data symbol $\hat{d}_{k,m}(n)$,
$N_D(k)$ is the number of data streams on subcarrier k,
$K_D$ is the number of data subcarriers,
$X_d(n)$ is a data-based phasor for symbol period n, and
$\theta_d(n)$ is a data-based phase error.

In equation (4), $X_d(n)$ is equal to a weighted sum of the dot products of the estimated data symbols and the hard decisions. $X_d(n)$ contains the weighted average phase error between the estimated data symbols and the hard decisions.

In a SISO transmission, the number of data streams is equal to one for all data subcarriers. In a MIMO transmission, the number of data streams is upper bounded by the smaller of the number of transmit antennas and the number of receive antennas, or $N_D \leq \min(T, R)$. The number of data streams may also vary from subcarrier to subcarrier and/or from OFDM symbol to OFDM symbol.

An absolute phase error may be obtained based upon the pilot and data symbols, as follows:

$$\theta_{abs}(n) = \tan^{-1}\{\mu_d \cdot X_d(n) + \mu_p \cdot X_p(n)\} \quad \text{Eq (6)}$$

where $\mu_d$ and $\mu_p$ are weighting factors for data and pilot symbols, respectively, and
$\theta_{abs}(n)$ is an absolute phase error obtained based upon data and pilot symbols.

The absolute phase error is the phase error observed in symbol period n and may be considered as a delta phase or an instantaneous phase error.

The weighting factors $\mu_d$ and $\mu_p$ may be selected to give greater weight to a more reliable phase estimate and less weight to a less reliable phase estimate in the combining process. The weighting factors may be fixed values or configurable values, e.g., determined by SNR estimates. The weighting factors may also be selected based upon maximal-ratio combining (MRC) or some other combining technique. Both $\mu_d$ and $\mu_p$ may be set to one to give equal weight to $X_d(n)$ and $X_p(n)$. $\mu_d$ may also be set to zero to omit $X_d(n)$, and $\mu_p$ may be set to zero to omit $X_p(n)$.

The receiver may estimate the frequency error at the receiver and remove the frequency error prior to performing OFDM demodulation. Residual error in the frequency error estimate causes a phase slope over time. In each symbol period, a running total of all previous phase corrections may be computed as follows:

$$\theta_{total}(n+1) = \alpha_{total} \cdot \theta_{total}(n) + \alpha_{abs} \cdot \theta_{abs}(n), \quad \text{Eq (7)}$$

where $\theta_{total}(n)$ is the total phase error in symbol period n, and
$\alpha_{total}$ and $\alpha_{abs}$ are scaling factors for $\theta_{total}(n)$ and $\theta_{abs}(n)$, respectively.

$\theta_{total}(n)$ may be initialized to zero prior to the first OFDM symbol. $\alpha_{total}$ and $\alpha_{abs}$ may be set to various values based upon the desired weighting for $\theta_{total}(n)$ and $\theta_{abs}(n)$, respectively. For example, $\alpha_{total}$ and $\alpha_{abs}$ may be defined as $\alpha_{total} = \alpha_{abs} = 1$, and equation (7) would simply accumulate $\theta_{abs}(n)$. Alternatively, $\alpha_{total}$ may be defined as $0 \leq \alpha_{total} \leq 1$, and $\alpha_{abs}$ may be defined as $\alpha_{abs} = 1 - \alpha_{total}$. In this case, equation (7) would implement an infinite impulse response (IIR) filter, with a larger value for $\alpha_{total}$ corresponding to more filtering, and vice versa.

The design in equation (7) sums the phases. In another design, complex values may be summed, which may yield a more accurate estimate since some information may be lost when summing only the phases.

The received symbols may be phase corrected as follows:

$$\tilde{r}_{k,m}(n) = r_{k,m}(n) \cdot e^{-j \cdot \theta_{total}(n)}, \quad \text{Eq (8)}$$

where $r_{k,m}(n)$ is a received symbol for stream m on subcarrier k, and $\tilde{r}_{k,m}(n)$ is a phase-corrected symbol corresponding to received symbol $r_{k,m}(n)$.

A single phase estimate may be obtained for all streams and subcarriers and applied to the received symbols for all streams and subcarriers, as described above. Alternatively, a phase estimate may be obtained for each stream or subcarrier and applied to the received symbols for that stream or subcarrier. In general, a phase estimate may be obtained for any number of streams and any number of subcarriers and applied to the received symbols for these streams and subcarriers. After the phase correction, detection and decoding may be performed on the phase-corrected symbols.

Figure 3:
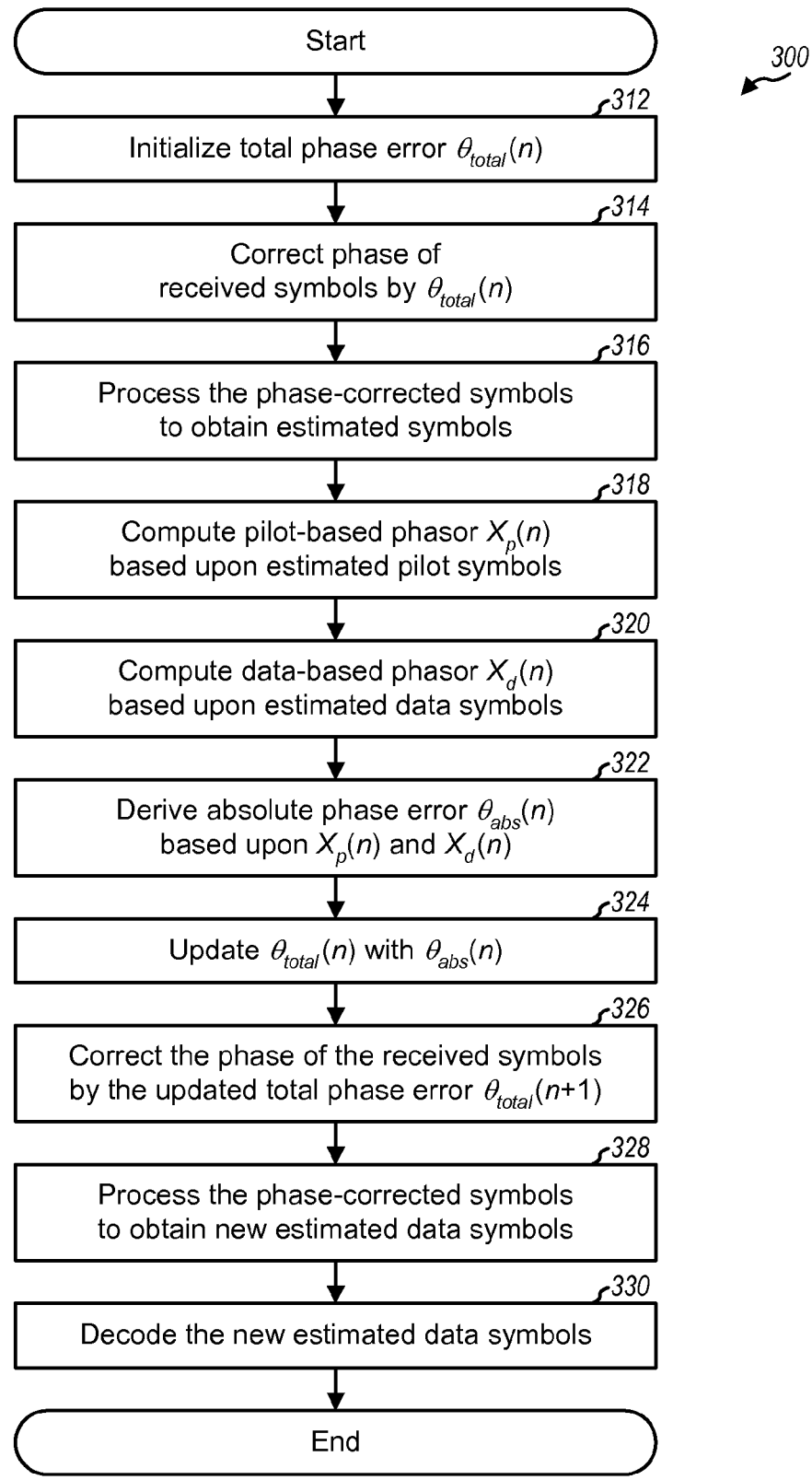
FIGS. 3 and 4 show two processes for performing phase correction with combined phase information.

FIG. 3 shows a process 300 for performing phase correction. The total phase error $\theta_{total}(n)$ and symbol period index n are initialized prior to the first OFDM symbol, e.g., $\theta_{total}(n)=0$ and n=0 (block 312). The received symbols from receiver/OFDM demodulators 254 for symbol period n are phase corrected by $\theta_{total}(n)$, e.g., as shown in equation (8) (block 314). The phase-corrected symbols are processed (e.g., detected) to obtain estimated pilot symbols and estimated data symbols (block 316). The pilot-based phasor $X_p(n)$ is computed based upon the estimated pilot symbols, e.g., as shown in equation (2) (block 318). The data-based phasor $X_d(n)$ is computed based upon the estimated data symbols and their hard decisions, e.g., as shown in equation (4) (block 320). The absolute phase error $\theta_{abs}(n)$ for the pilot and data symbols may be derived based upon phasors $X_p(n)$ and $X_d(n)$, e.g., as shown in equation (6) (block 322). The total phase error $\theta_{abs}(n)$ is updated with the absolute phase error, e.g., as shown in equation (7), and the symbol period index n is incremented (block 324).

The received symbols from receiver/OFDM demodulators 254 are phase corrected by the updated total phase error $\theta_{total}(n+1)$, which includes the phase error for the current symbol period n (block 326). The phase-corrected symbols are then processed (e.g., detected) to obtain new estimated data symbols (block 328), which are decoded to obtain decoded data (block 330).

In FIG. 3, the received symbols are detected/processed twice in two stages. In the first stage, the received symbols from receiver/OFDM demodulators 254 are first phase corrected with the current $\theta_{total}(n)$, then $\theta_{abs}(n)$ is determined and used to update $\theta_{total}(n)$ to obtain $\theta_{total}(n+1)$. In the second stage, the received symbols from receiver/OFDM demodulators 254 are again phase corrected with the updated $\theta_{total}(n+1)$ obtained from the first stage, which should be more accurate than the $\theta_{total}(n)$ used in the first stage. The first detection in block 316 for the first stage provides the estimated pilot and data symbols used to compute $X_p(n)$ and $X_d(n)$. The second detection in block 328 for the second stage provides new estimated data symbols for decoding.

Figure 4:
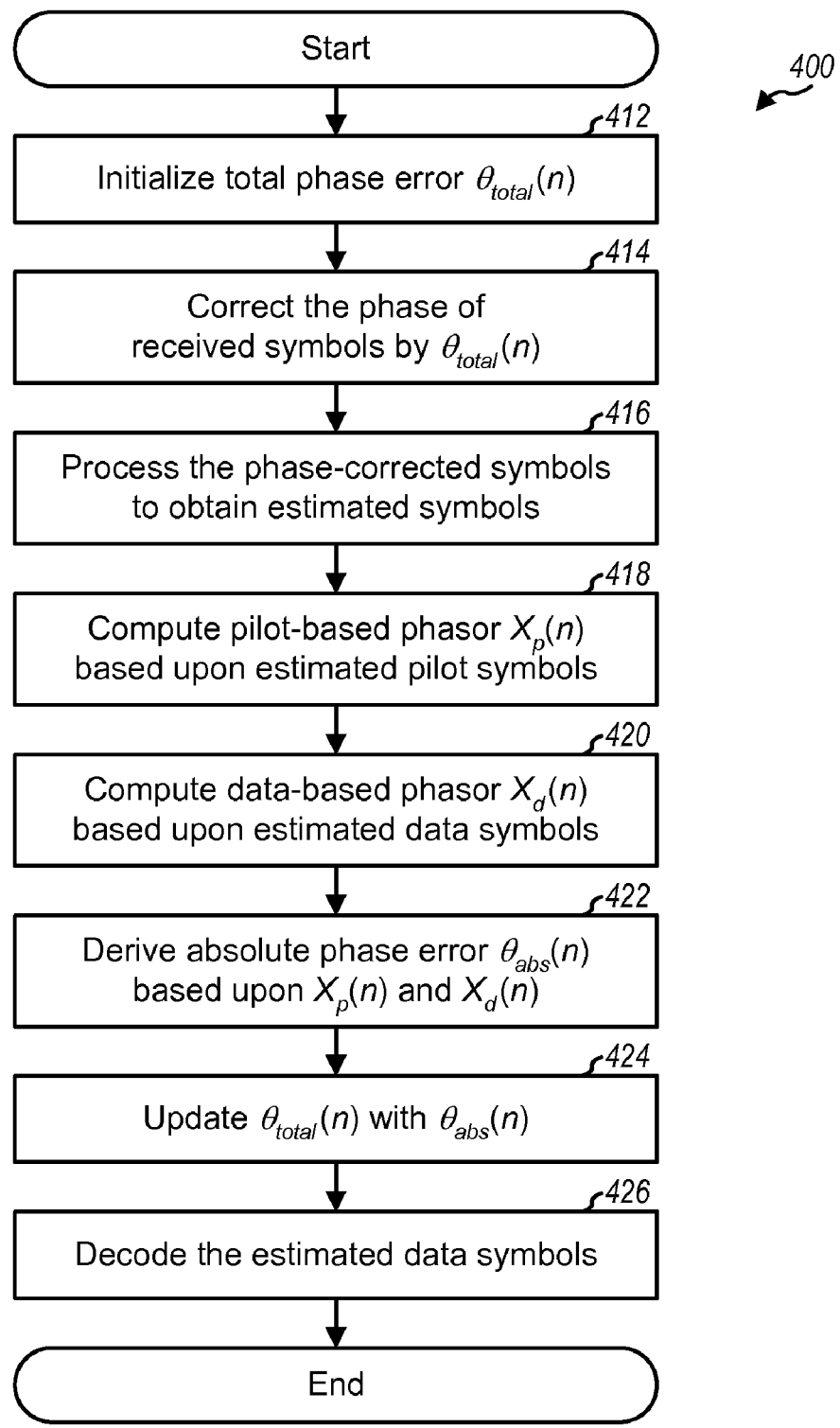

FIG. 4 shows a process 400 for performing phase correction by performing detection once. The total phase error $\theta_{total}(n)$ and symbol period index n are initialized prior to the first OFDM symbol, e.g., $\theta_{total}(n)=\theta_{pre}$ and n=0 (block 412). $\theta_{pre}$ may be a phase estimate obtained from one or more OFDM symbols preceding the first OFDM symbol carrying data, e.g., OFDM symbols for a preamble, a MIMO pilot, etc.

The received symbols for symbol period n are phase corrected by $\theta_{total}(n)$ (block 414). The phase-corrected symbols are processed (e.g., detected) to obtain estimated pilot symbols and estimated data symbols (block 416). The pilot-based phasor $X_p(n)$ is computed based upon the estimated pilot symbols (block 418). The data-based phasor $X_d(n)$ is computed based upon the estimated data symbols and their hard decisions (block 420). The absolute phase error $\theta_{abs}(n)$ may be derived based upon phasors $X_p(n)$ and $X_d(n)$ (block 422). The total phase error $\theta_{total}(n)$ is updated with the absolute phase error, and the symbol period index n is incremented (block 424). The estimated data symbols are decoded to obtain decoded data (block 426).

In FIG. 4, phase correction is performed on the received symbols based upon the total phase error obtained in the prior symbol period. Pilot-based and data-based phase estimates are obtained based upon the estimated pilot and data symbols. The total phase error is updated with the phase estimates and used in the next symbol period. The received symbols are not corrected by the updated total phase error to avoid a second detection.

In another design, the received pilot symbols are phase corrected by the total phase error and detected. The pilot-based phasor $X_p(n)$ and pilot-based phase error $\theta_p(n)$ are obtained based upon the estimated pilot symbols. The total phase error $\theta_{total}(n)$ is updated with $\theta_p(n)$. The received data symbols are phase corrected by the updated total phase error and detected. The data-based phasor $X_d(n)$ and data-based phase error $\theta_d(n)$ are obtained based upon the estimated data symbols. The total phase error is updated again with $\theta_d(n)$. In this design, the received data symbols are corrected by the pilot-based phase error $\theta_p(n)$ obtained in the current symbol period, and the data-based phase error $\theta_d(n)$ is used in the next symbol period.

In yet another design, blocks 412 through 424 are performed as described above for FIG. 4 to obtain the estimated data symbols. The estimated data symbols are then phase corrected by $\theta_{abs}(n)$ to obtain phase-corrected estimated data symbols, which are decoded to obtain decoded data. This design removes the data-based phase error after detection.

The phase correction techniques described herein may be used for various wireless communication networks such as WLANs that implement the IEEE 802.11 family of standards developed by The Institute of Electrical and Electronics Engineers (IEEE) for WLANs. IEEE 802.11, 802.11a, 802.11b, 802.11g, and 802.11n cover different radio technologies and have different capabilities. For clarity, the techniques are described below for a WLAN that implements IEEE 802.11a, 802.11g and/or 802.11n, all of which utilize OFDM.

IEEE 802.11a/g utilizes a subcarrier structure that partitions the system bandwidth into K=64 subcarriers, which are assigned indices of −32 to +31. These 64 total subcarriers include 48 data subcarriers with indices of ±{1, . . . , 6, 8, . . . , 20, 22, . . . , 26} and four pilot subcarriers with indices of ±{7, 21}. The DC subcarrier with index of 0 and the remaining subcarriers are not used. This subcarrier structure is described in IEEE Standard 802.11a entitled "Part 11: Wireless LAN Medium Access Control (MAC) and Physical Layer (PHY) Specifications: High-speed Physical Layer in the 5 GHz Band," September 1999, which is publicly available. IEEE 802.11n utilizes a subcarrier structure with 64 total subcarriers that include 52 data subcarriers with indices of ±{1, . . . , 6, 8, . . . , 20, 22, 28} and four pilot subcarriers with indices of ±{7, 21}.

Figure 5:
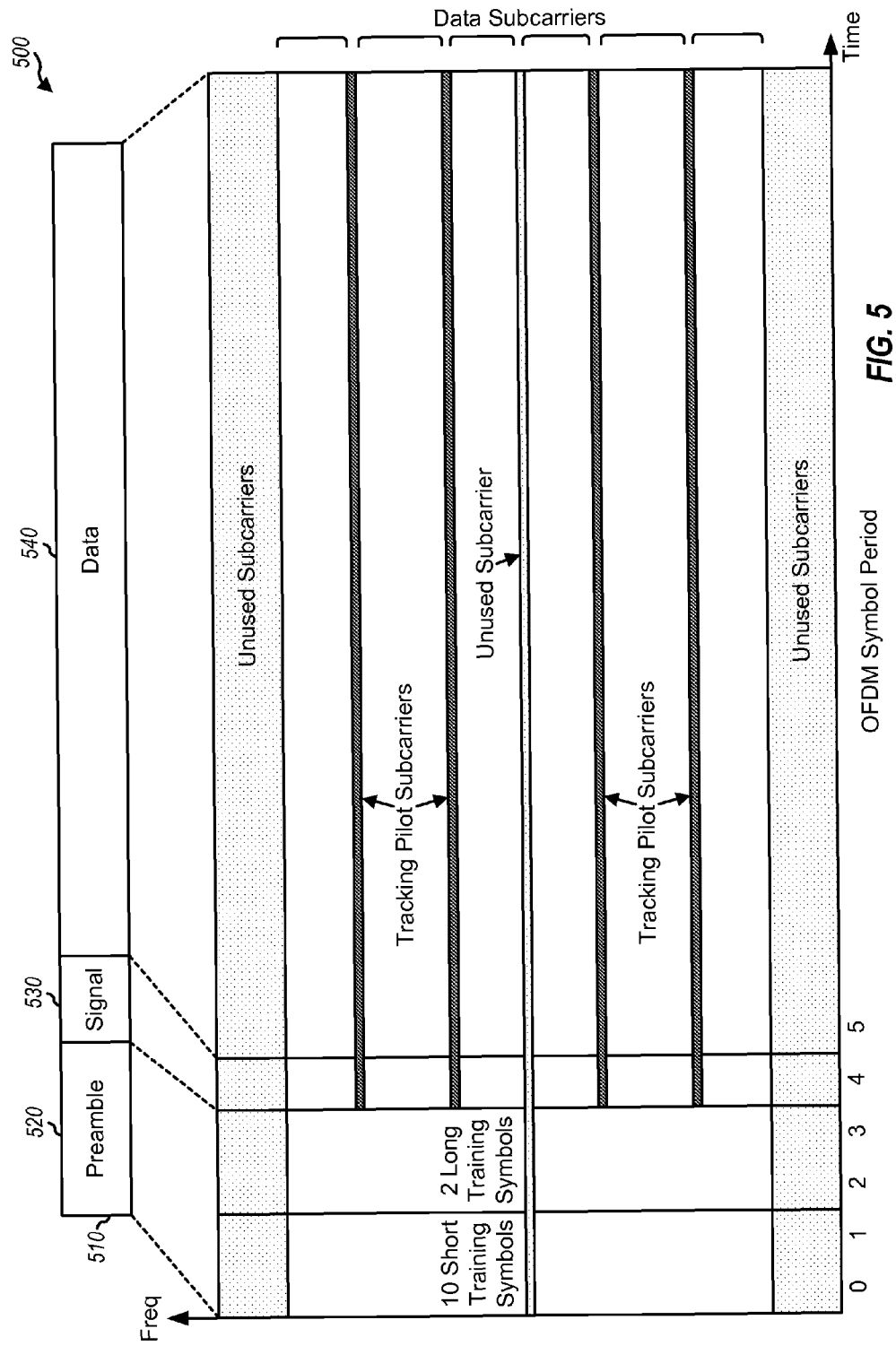
FIG. 5 shows a data format in IEEE 802.11a/g.

FIG. 5 shows a data format 500 defined by IEEE 802.11a/g. At a physical layer (PHY), data is processed and transmitted in PHY protocol data units (PPDUs). Each PPDU 510 includes a preamble section 520, a signal section 530, and a data section 540. Preamble section 520 carries ten short training symbols in the first two OFDM symbols followed by two long training symbols in the next two OFDM symbols. The short training symbols are generated based on a set of 12 pilot symbols mapped to a set of 12 subcarriers, as described in 802.11a/g. The long training symbols are generated based on a set of 52 pilot symbols mapped to a set of 52 subcarriers, as also described in 802.11a/g. Signal section 530 carries one OFDM symbol of signaling for the PPDU. Data section 540 carries a variable number of OFDM symbols for data. Signaling and data are sent on the 48 data subcarriers in signal section 530 and data section 540, respectively. A tracking pilot is sent on the four pilot subcarriers in each OFDM symbol within the signal and data sections. The pilot symbols for each pilot subcarrier are generated based upon a known pseudo-random number (PN) sequence.

For IEEE 802.11n, a MIMO pilot section is inserted between signal section 530 and data section 540 and carries a MIMO pilot used for MIMO channel estimation.

Figure 6:
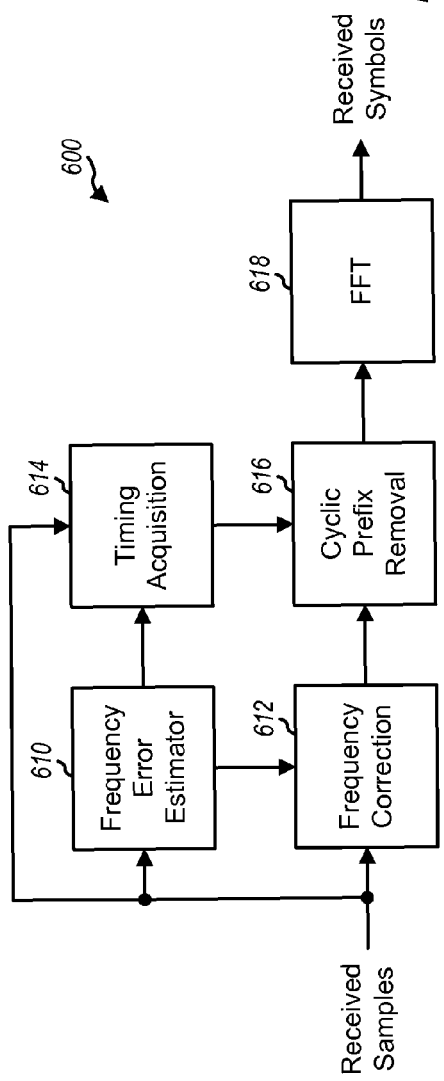
FIG. 6 shows an OFDM demodulator.

FIG. 6 shows a design of an OFDM demodulator 600, which may be used in receiver/OFDM demodulator 154 in FIG. 1 and also in each of receivers/OFDM demodulators 254a through 254r in FIG. 2.

Within OFDM demodulator 600, a frequency error estimator 610 estimates the frequency error at the receiver (e.g., based upon the long and/or short training symbols in a received PPDU) and provides a frequency error estimate $f_{err}$. A frequency correction unit 612 removes the phase slope due to the frequency error, as follows:

$$\tilde{x}(t) = x(t) \cdot e^{j2\pi \cdot f_{err} \cdot T_{samp} \cdot t} \qquad \text{Eq (9)}$$

where $x(t)$ is a received sample for sample period t, $T_{sym}$ is one sample period, and $\tilde{x}(t)$ is a frequency-correct sample for sample period t.

A timing acquisition unit 614 determines the timing of the received PPDU, e.g., based upon the long and/or short training symbols. Unit 614 also receives the frequency error estimate and adjusts the timing to account for the frequency error. At the receiver, the sampling clock used for digitization and the local oscillator (LO) signal used for downconversion may be generated based upon a single reference oscillator. In this case, frequency error in the reference oscillator causes both frequency error in the LO signal as well as timing error in the sampling clock. Hence, a frequency error of z parts per million (ppm) corresponds to a timing error of z ppm. Unit 614 may determine the per-sample timing error due to the frequency error and compute the total timing error in each symbol period by accumulating the per-sample timing error across time.

A received OFDM symbol contains K+C samples, where C is the cyclic prefix length. For OFDM demodulation, unit 614 generates an FFT window that selects K samples from among the K+C samples. When the total timing error exceeds ±1 sample period, ±1 sample period may be subtracted from the total timing error, and the FFT window may be shifted forward by one sample period (for +) or backward by one sample period (for −). This keeps the FFT window within one sample of the initial timing. With a frequency error of 40 ppm for the reference oscillator, the total timing error may be half of the short training symbol in 5 milliseconds (ms). This timing slip may be corrected to improve performance, especially for long packets supported by IEEE 802.11n.

A cyclic prefix removal unit 616 obtains the frequency-corrected samples from unit 612 and the FFT window from unit 614. For each received OFDM symbol, unit 616 removes the cyclic prefix and provides K samples within the FFT window. An FFT unit 618 performs a K-point FFT on the frequency-correct samples from unit 616 and provides received symbols for the K total subcarriers.

Figure 7:
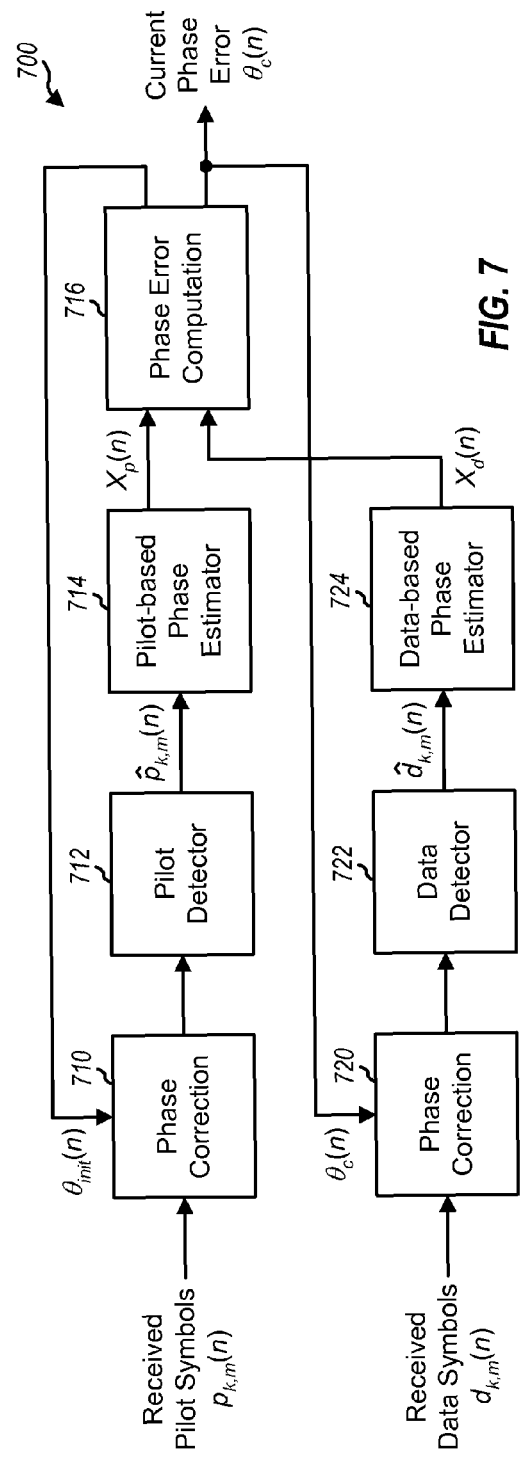
FIG. 7 shows a phase correction unit.

FIG. 7 shows a design of a phase correction unit 700. In each symbol period, a phase correction unit 710 obtains received pilot symbols $p_{k,m}(n)$ for the tracking pilot and an initial phase error $\theta_{init}(n)$, which may be the phase error $\theta_c(n-1)$ applied to the received data symbols in the prior symbol period, an accumulated phase error, zero, or some other value. Unit 710 removes the phase error $\theta_{init}(n)$ from the received pilot symbols and provides phase-corrected pilot symbols. A detector 612 performs detection on the phase-corrected pilot symbols and provides estimated pilot symbols $\hat{p}_{k,m}(n)$. A phase estimator 714 derives the pilot-based phasor $X_p(n)$ based upon the estimated pilot symbols. A phase error computation unit 716 receives $X_p(n)$ and provides a current phase error $\theta_c(n)$ for the current symbol period.

A phase correction unit 720 obtains received data symbols $d_{k,m}(n)$ and the current phase error $\theta_c(n)$, removes the current phase error from the received data symbols, and provides phase-corrected data symbols. A detector 722 performs detection on the phase-corrected data symbols and provides estimated data symbols $\hat{d}_{k,m}(n)$. A phase estimator 724 derives the data-based phasor $X_d(n)$ based upon the estimated data symbols. Computation unit 716 receives $X_d(n)$ and updates the total phase error.

Units 712 and 722 may be part of data/pilot detector 162 in FIG. 1 or MIMO detector 262 in FIG. 2. The remaining units in FIG. 7 may be part of phase correction unit 160 in FIG. 1 or phase correction unit 260 in FIG. 2.

The pilot-based phasor $X_p(n)$ may be obtained based upon the estimated pilot symbols and used to derive the current phase error $\theta_c(n)$. The received data symbols may be phase corrected by $\theta_c(n)$ and detected to obtain the estimated data symbols. The data-based phasor $X_d(n)$ may then be obtained based upon the estimated data symbols and used to determine the phase error for the next symbol period. The pilot-based phase estimate may thus be used for the current OFDM symbol whereas the data-based phase estimate may be used for the next OFDM symbol. Phase error estimation and correction may also be performed in other manners.

The phase error computation in block 716 may be performed in various manners. The phase error computation may be performed as described above for equations (2) through (7). The phase error computation may also be performed using phasors (or complex values) for the phase estimates, as described below. The phasors support simple maximal-ratio combining of phase estimates from different sources so that more reliable phase estimates are weighted more in the combining process. By representing the phase estimates using phasors, the amplitude of a phasor can reflect the weighting for the corresponding phase estimate. The computation of the phasors may include SNR information, so that the accuracy/reliability of the phase estimates is reflected directly in the phasor amplitude. The phase error may be derived by summing the phasors and determining the angle of the result, as described below.

The pilot-based phasor $X_p(n)$ may be derived based upon the estimated pilot symbols, e.g., as shown in equation (2). The current phasor and the corresponding current phase error may be determined as follows:

$$X_c(n) = \overline{Y}_p \cdot X_p(n) + \alpha \cdot X_t(n), \text{ and} \qquad \text{Eq (10)}$$

$$\theta_c(n) = \tan^{-1}\{X_c(n)\}, \qquad \text{Eq (11)}$$

where $X_p(n)$ is a phasor obtained from the tracking pilot in the current symbol period, $X_t(n)$ is a total phasor obtained in the prior symbol period, $X_c(n)$ is a current phasor for the current symbol period, $\alpha$ is a scaling factor, and $\overline{Y}_p$ is a pilot offset correction.

The total phasor $X_t(n)$ is a complex value having an amplitude that is related to the standard deviation of the phase error. $X_t(n)$ may be initialized as $X_t(0) = A_{init} + j0$, where $A_{init}$ is an amplitude that may be dependent on phase noise level, residual frequency error, the time between the center of the preamble or MIMO pilot and the center of the first OFDM symbol in the signaling section, etc.

In equation (10), the current phasor $X_c(n)$ is a weighted sum of the pilot-based phasor $X_p(n)$ and the total phasor $X_t(n)$. Scaling factor $\alpha$ determines the weight given to the total phasor $X_t(n)$ in computing the current phasor $X_c(n)$. $\alpha$ may be selected based upon the frequency error and the oscillator phase noise at the receiver. For example, a small value may be used for $\alpha$ if the phase noise is large and/or if prior information is not reliable, and vice versa. $\alpha$ may be set to one value initially and to another value after a predetermined number of OFDM symbols. $\alpha$ may also be set to zero to use only the pilot symbols for phase correction. The pilot offset correction $\overline{Y}_p$ is a unit-magnitude phasor that compensates for systematic error of the tracking pilot phase estimate and may be determined as described below. $\overline{Y}_p$ may be set to zero to use only the estimated data symbols for phase correction. The current phasor $X_c(n)$ is used for phase correction of the data symbols in the current symbol period.

The data-based phasor $X_d(n)$ may be derived based upon the estimated data symbols, e.g., as shown in equation (4). $X_d(n)$ may also be derived in a manner to account for SNR and signal constellation. The number of hard decision errors is dependent on SNR and may be significant at low SNRs, especially for code rate of ½. Hard decision errors may result in the mean of the phase error being smaller in absolute value than the actual value. The amount of bias in the mean phase error is dependent on the SNR and signal constellation. This bias may be corrected by scaling down the real component of the phasor relative to the imaginary part.

The dot product of an estimated data symbol and its hard decision may be expressed as:

$$w_{k,m}(n) = \beta_{k,m}(n) \cdot \hat{d}^*_{k,m}(n) \cdot d_{k,m}(n) \qquad \text{Eq (12)}$$

where $w_{k,m}(n)$ is a scaled dot product of the estimated data symbol $d_{k,m}(n)$ with the hard decision $\hat{d}_{k,m}(n)$. Scaling factor $\beta_{k,m}(n)$ may be based upon SNR and/or other factors.

The data-based phasor $X_d(n)$ may then be expressed as:

$$X_d(n) = \sum_{k=1}^{K_D} \sum_{m=1}^{N_D(k)} \mu_i \cdot \text{Re}\{w_{k,m}(n)\} + j \sum_{k=1}^{K_D} \sum_{m=1}^{N_D(k)} \mu_q \cdot \text{Im}\{w_{k,m}(n)\}, \qquad \text{Eq (13)}$$

where $\mu_i$ and $\mu_q$ are scale factors for the real and imaginary components, respectively.

The scale factors $\mu_i$ and $\mu_q$ may be selected based upon the SNR of each stream and subcarrier, the signal constellation, etc. The use of two different scale factors for the real and imaginary components accomplishes both bias correction and maximal-ratio combining. $\mu_i$ and $\mu_q$ may also be dependent on modulation symbol location. For example, modulation symbols at the edges of a signal constellation typically have less neighbors, may be more reliable, and may be given higher weight whereas modulation symbols away from the edges typically have more neighbors, may be less reliable, and may be given lower weight.

The absolute phase error of the received data symbols, which is the phase error prior to the phase correction in block 720, may be obtained as follows:

$$X_{du}(n) = X_d(n) \cdot \overline{X}_c(n), \qquad \text{Eq (14)}$$

where $\overline{X}_c(n)$ is a normalized (unit magnitude) version of $X_c(n)$, and $X_{du}(n)$ is a phasor for the absolute phase error of the data symbols.

The data-based phasor $X_d(n)$ is obtained after phase correction in block 720. The phase error prior to this phase correction is obtained by adding back the phase correction by block 720. This is achieved by multiplying $X_d(n)$ with $\overline{X}_c(n)$, which rotates $X_d(n)$ by the angle of $X_c(n)$.

The total phasor may then be determined as follows:

$$X_t(n+1) = X_c(n) + X_{du}(n). \qquad \text{Eq (15)}$$

In equation (15), the absolute phase error of the data symbols is combined with the current phase error to obtain the total phase error, where the combining is performed with phasors to achieve maximal-ratio combining.

The pilot offset correction $\overline{Y}_p$ compensates for systematic error of the tracking pilot channel estimate and may be determined as described below. The phase difference between the absolute phasor $X_{du}(n)$ and the pilot-based phasor $X_p(n)$ may be computed and accumulated as follows:

$$Y_p = \sum_{i=1}^{L} X_{du}(i) \cdot X_p^*(i), \qquad \text{Eq (16)}$$

where L is the number of symbol periods to accumulate and may be any integer value.

The accumulation in equation (16) may be performed over L symbol periods at the start of a transmission, and the result may be used for the remainder of the transmission. A running accumulation may also be performed to obtain $Y_p$. $Y_p$ is then normalized to obtain $\overline{Y}_p$, which is used to correct the pilot-based phasor $X_p(n)$ in equation (10).

Figure 8:
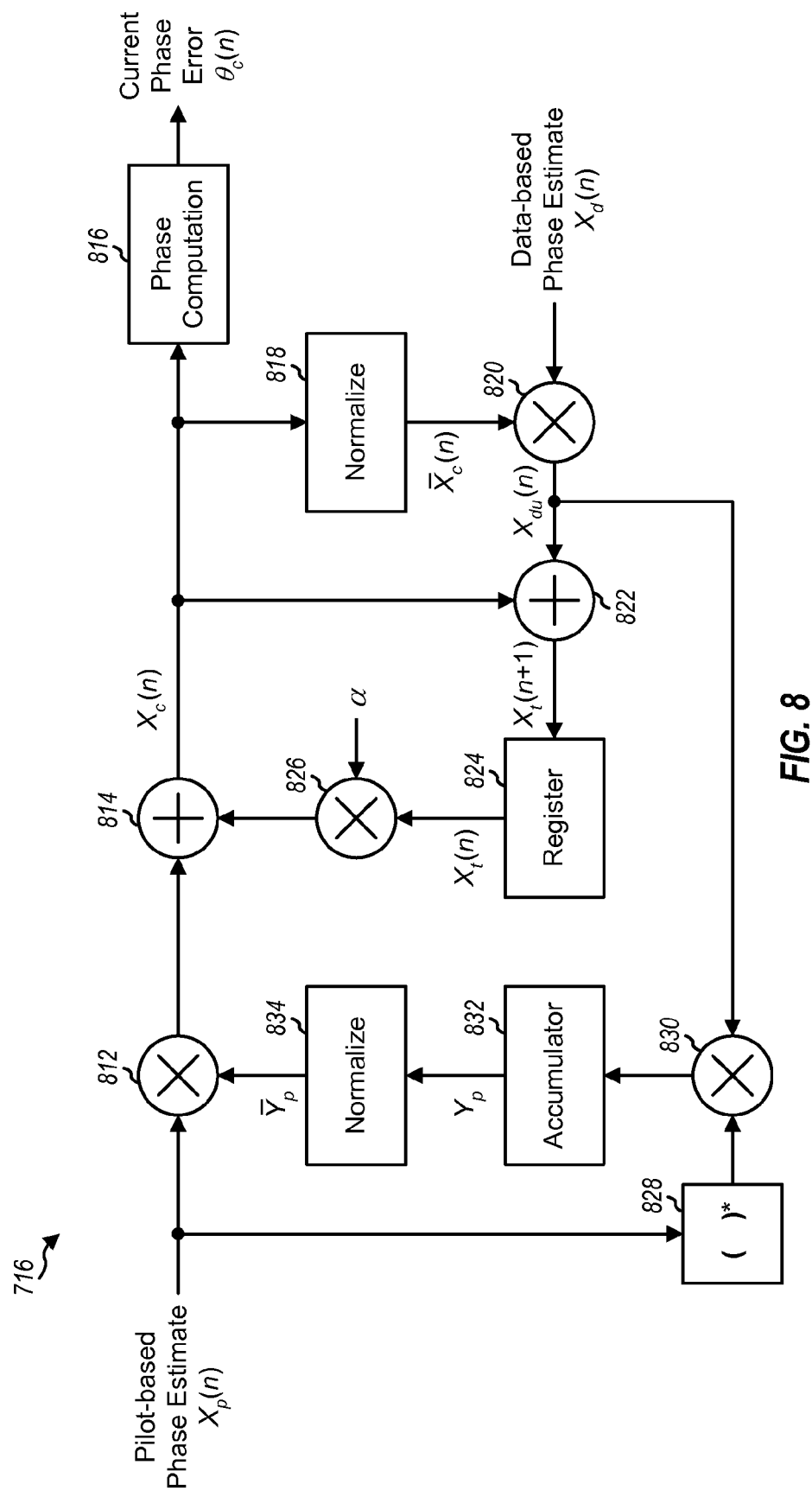
FIG. 8 shows a phase error computation unit.

FIG. 8 shows a design of phase error computation unit 716 in FIG. 7. A multiplier 812 multiplies the pilot-based phasor $X_p(n)$ with the pilot offset correction $\overline{Y}_p$. A multiplier 826 multiplies the total phasor $X_t(n)$ with scaling factor $\alpha$. A summer 814 sums the outputs of multipliers 812 and 826 and provides the current phasor $X_c(n)$, as shown in equation (10). A unit 816 computes the phase of $X_c(n)$ as shown in equation (11) and provides the current phase correction $\theta_c(n)$ for the current symbol period.

A unit 818 normalizes $X_c(n)$ and provides $\overline{X}_c(n)$. A multiplier 820 multiplies the data-based phasor $X_d(n)$ with $\overline{X}_c(n)$ and provides the absolute phasor $X_{du}(n)$, as shown in equation (14). A summer 822 sums the current phasor $X_c(n)$ with the absolute phasor $X_{du}(n)$ and provides the updated total phasor $X_t(n+1)$ for the next symbol period, as shown in equation (15). A register 824 stores the total phasor for use in the next symbol period.

A unit 828 receives the pilot-based phasor $X_p(n)$ and provides a conjugated phasor $X^*_p(n)$. A multiplier 830 multiplies the output of unit 828 with the absolute phasor $X_{du}(n)$. An accumulator 832 accumulates the output of multiplier 830 over L symbol periods and provides phasor $Y_p$, as shown in equation (16). A unit 834 normalizes $Y_p$ and provides $\bar{Y}_p$.

Figure 9:
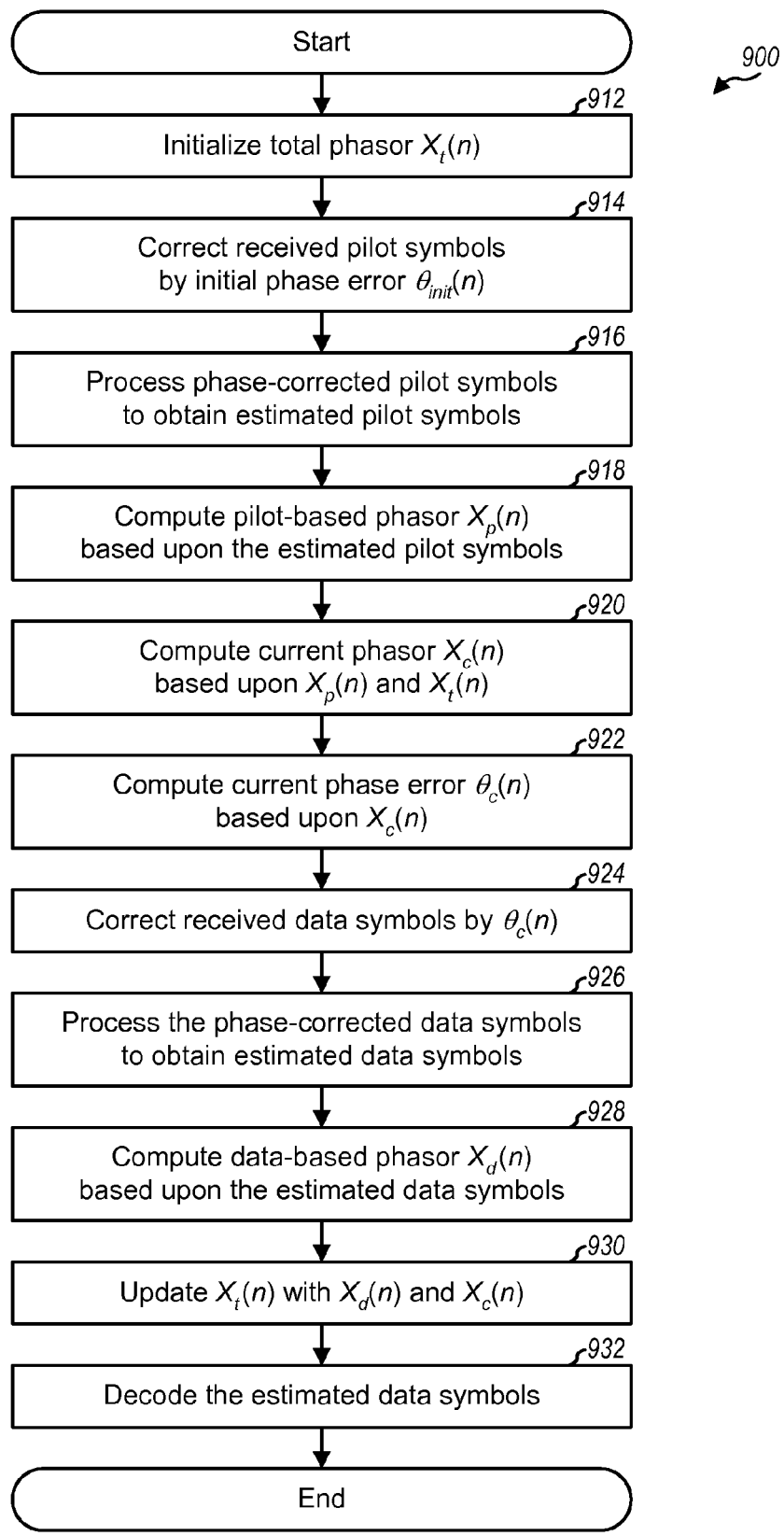
FIGS. 9 and 10 show two processes for performing phase correction in multiple steps.

FIG. 9 shows a process 900 for performing phase correction. The total phasor $X_t(n)$ and symbol period index n are initialized prior to the first OFDM symbol (block 912). The received pilot symbols for symbol period n may be phase corrected by an initial phase error (block 914). The phase-corrected pilot symbols are processed (e.g., detected) to obtain estimated pilot symbols (block 916). The pilot-based phasor $X_p(n)$ is computed based upon the estimated pilot symbols (block 918). The current phasor $X_c(n)$ is determined based upon the pilot-based phasor $X_p(n)$ and the total phasor $X_t(n)$, e.g., as shown in equation (10) (block 920). The current phase error $\theta_c(n)$ is computed based upon the current phasor $X_c(n)$ (block 922).

The received data symbols for symbol period n are phase corrected by the current phase error $\theta_c(n)$ (block 924). The phase-corrected data symbols are processed (e.g., detected) to obtain estimated data symbols (block 926). The data-based phasor $X_d(n)$ is computed based upon the estimated data symbols and their hard decisions, e.g., as shown in equations (12) and (13) (block 928). The total phasor is updated with the data-based phasor $X_d(n)$ and the current phasor $X_c(n)$, e.g., as shown in equations (14) and (15) (block 930). The estimated data symbols are decoded (block 932).

Figure 10:
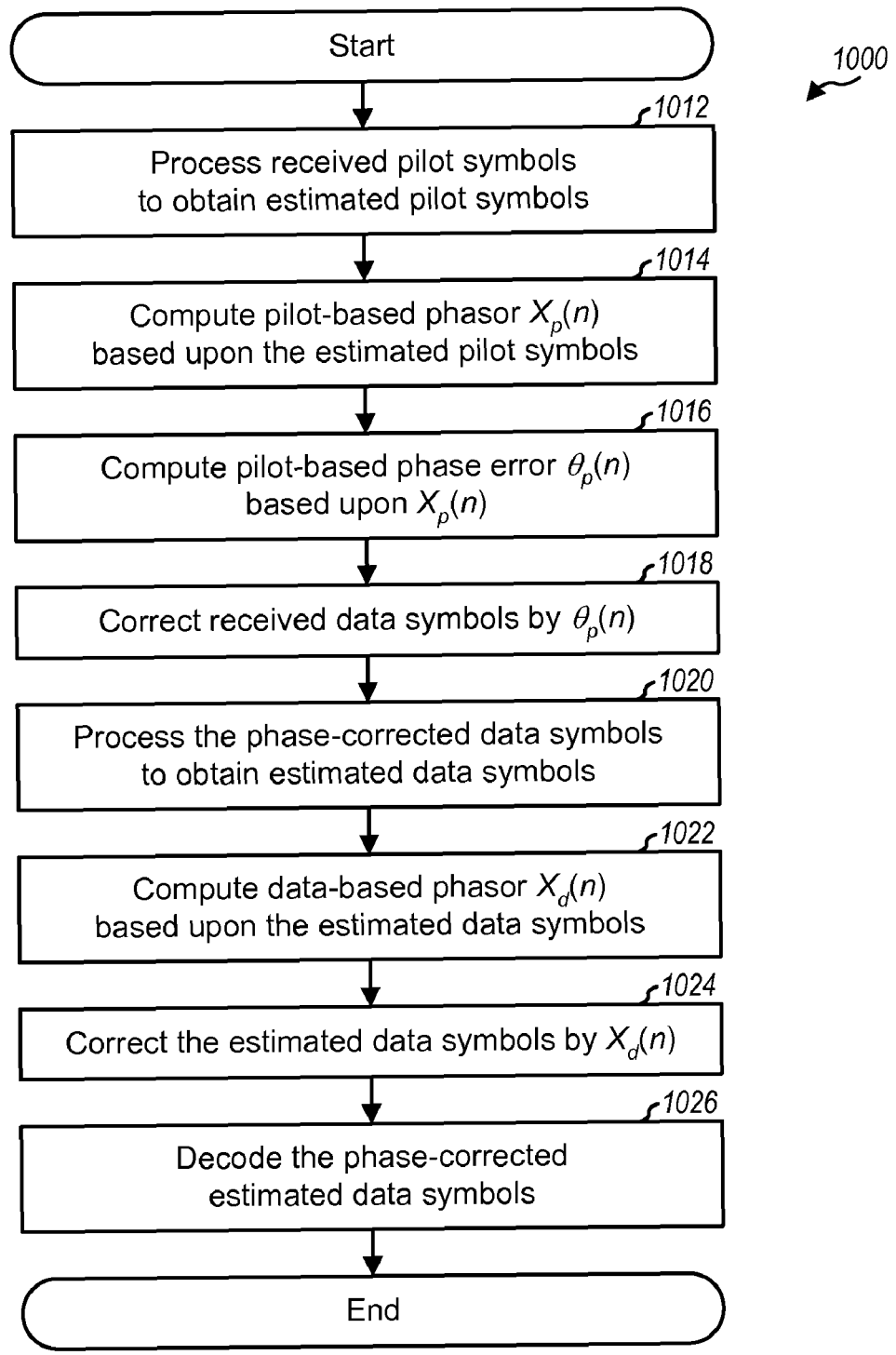

FIG. 10 shows a process 1000 for performing phase correction. The received pilot symbols are processed (e.g., detected) to obtain estimated pilot symbols (block 1012). The pilot-based phasor $X_p(n)$ is computed based upon the estimated pilot symbols (block 1014) and used to derive the pilot-based phase error $\theta_p(n)$ (block 1016). The received data symbols are phase corrected by $\theta_p(n)$ (block 1018) and processed (e.g., detected) to obtain estimated data symbols (block 1020). The data-based phasor $X_d(n)$ is then computed based upon the estimated data symbols (block 1022). The estimated data symbols are then corrected based upon the data-based phasor (block 1024), as follows:

$$\tilde{d}_{k,m}(n) = \hat{d}_{k,m}(n) \cdot \bar{X}^*_d(n) \quad \text{Eq (17)}$$

where $\tilde{d}_{k,m}(n)$ is a phase-corrected estimated data symbol. The phase-corrected estimated data symbols are decoded (block 1026).

In FIG. 10, the phase correction is performed independently in each symbol period. No phase information is carried from one symbol period to the next.

FIGS. 3, 4, 9 and 10 show some examples of performing phase correction using both pilot symbols and data symbols. Phase correction may also be performed in other manners.

FIG. 11 shows a process 1100 for performing phase correction. Received pilot symbols and received data symbols are obtained from an OFDM and/or MIMO transmission (block 1112). First phase information is obtained based upon the received pilot symbols (block 1114). Second phase information is obtained based upon the received data symbols (block 1116). The first and second phase information may be obtained in various manners and represented in various forms. The phase of the received data symbols is corrected based upon the first and second phase information (block 1118). The phase correction may use the first and second phase information directly and/or indirectly and may be performed in one or more steps. For example, the first phase information may be applied to the data symbols, and the second phase information may be applied to the pilot symbols. The second phase information would affect the first phase information and would thus be applied to the data symbols indirectly via the pilot symbols. Timing may also be adjusted based upon the first and/or second phase information.

For block 1114, the phase of the received pilot symbols may be corrected, e.g., by an initial phase error, which may be the phase error for a prior symbol period, zero, or some other value. Detection may be performed on the phase corrected pilot symbols to obtain estimated pilot symbols. Dot products of the estimated pilot symbols and known pilot symbols may be computed, weighted by scaling factors that may be dependent on SNR estimates and/or other factors for different subcarriers and streams, and combined to obtain the first phase information. For block 1116, the phase of the received data symbols may be corrected, e.g., by the first phase information. Detection may be performed on the phase corrected data symbols to obtain estimated data symbols. Hard decisions may be obtained for the estimated data symbols. Dot products of the estimated data symbols and the hard decisions may be computed, weighted by scaling factors that may be dependent on SNR and/or other factors, and combined to obtain the second phase information. The first and second phase information may also be obtained in other manners.

Block 1118 may be performed in various manners. In one scheme, the phase of the received pilot symbols is corrected based upon the second phase information (e.g., from the prior symbol period), the first phase information is obtained based upon the phase corrected pilot symbols, and the phase of the received data symbols is corrected based upon the first phase information. In another scheme, the phase of the received data symbols is corrected based upon the first phase information, detection is performed on the phase corrected data symbols to obtain estimated data symbols, the second phase information is obtained based upon the estimated data symbols, and the phase of the estimated data symbols is corrected based upon the second phase information, e.g., as shown in FIG. 10. In yet another scheme, the first and second phase information is combined to obtain combined phase information, and the phase of the received data symbols is corrected based upon the combined phase information, e.g., as shown in FIGS. 3 and 4. The phase correction for the data symbols may also be performed in other manners.

FIG. 12 shows an apparatus 1200 for performing phase correction. Apparatus 1200 includes means for obtaining received pilot symbols and received data symbols from an OFDM and/or MIMO transmission (module 1212), means for obtaining first phase information based upon the received pilot symbols (module 1214), means for obtaining second phase information based upon the received data symbols (module 1216), and means for correcting the phase of the received data symbols based upon the first and second phase information (module 1218). The modules 1212 to 1218 may comprise processors, electronics devices, hardware devices, electronics components, logical circuits, memories, etc., or any combination thereof.

The frequency error estimate from unit 610 in FIG. 6 typically has some error, and this residual frequency error causes a phase slope over time. The phase error may be accumulated across a received transmission (e.g., a received packet), and the accumulated phase error may be used to estimate the residual frequency error. The residual frequency error estimate may be provided to units 610 and 614 in FIG. 6 and used to correct frequency error as well as timing error in the received samples.

The phase correction techniques utilize phase information from various sources such as pilot symbols, data symbols, and so on. The phase information from the pilot and data symbols provides an accurate estimate of the residual frequency error and may be used for phase correction in various manners, some of which are described above. The phase information from the pilot and data symbols in different symbol periods may be combined in various manners. A weighted phase correction value may be derived based upon the phase information from different sources, subcarriers, streams, and symbol periods and used for phase correction in the current symbol period. The phase information from the data symbols may be used in the current or next symbol period depending on latency, processing, and/or other factors.

The techniques described herein may be beneficial when a residual frequency error causes a phase slope over time. The techniques may also be beneficial for phase error that does not grow in time, e.g., phase error that may be random from one OFDM symbol the next, such as phase noise. The techniques may be used for any number of streams, which may have the same or different rates, e.g., a separate rate applied independently to each stream.

The phase correction techniques described herein may be implemented by various means. For example, these techniques may be implemented in hardware, firmware, software, or a combination thereof. For a hardware implementation, the processing units used to perform phase correction may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 172 in FIG. 1 or memory 272 in FIG. 2) and executed by a processor (e.g., processor 170 or 270). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein.

What is claimed is:

1. An apparatus comprising:
at least one processor configured to obtain first phase information based upon received pilot symbols from a first set of subcarriers in a current symbol period, to obtain second phase information based upon received data symbols from a second set of subcarriers in the current symbol period, to correct phase of the received data symbols in the current symbol period based upon the first phase information, and to correct phase of received data symbols in a subsequent symbol period based on the second phase information; and
a memory coupled to the at least one processor.

2. The apparatus of claim 1, wherein the at least one processor is configured to perform OFDM demodulation on samples to obtain the received pilot symbols from the first set of subcarriers and the received data symbols from the second set of subcarriers.

3. The apparatus of claim 1, wherein the at least one processor is configured to correct phase of the received pilot symbols, to obtain the first phase information based upon phase corrected pilot symbols, and to correct the phase of the received data symbols based upon the first phase information.

4. The apparatus of claim 1, wherein the at least one processor is configured to correct the phase of the received data symbols based upon the first phase information, to perform detection on phase corrected data symbols to obtain estimated data symbols, to obtain the second phase information based upon the estimated data symbols, and to correct phase of the estimated data symbols based upon the second phase information.

5. The apparatus of claim 1, wherein the at least one processor is configured to combine the first and second phase information to obtain combined phase information, and to correct the phase of the received data symbols based upon the combined phase information.

6. The apparatus of claim 5, wherein the at least one processor is configured to scale the first and second phase information and to combine the scaled first and second phase information to obtain the combined phase information.

7. The apparatus of claim 5, wherein the at least one processor is configured to represent the first phase information with a first complex value having a first amplitude indicative of reliability of the first phase information, to represent the second phase information with a second complex value having a second amplitude indicative of reliability of the second phase information, and to combine the first and second phase information based upon the first and second complex values.

8. The apparatus of claim 1, wherein the at least one processor is configured to represent the first phase information with a first phase value and to represent the second phase information with a second phase value.

9. The apparatus of claim 1, wherein the at least one processor is configured to represent the first phase information with a first complex value and to represent the second phase information with a second complex value.

10. The apparatus of claim 1, wherein the at least one processor is configured to obtain estimated pilot symbols based upon the received pilot symbols and to sum dot products of the estimated pilot symbols and known pilot symbols to obtain the first phase information.

11. The apparatus of claim 1, wherein the at least one processor is configured to obtain estimated pilot symbols based upon the received pilot symbols, to obtain signal-to-noise ratio (SNR) estimates for the first set of subcarriers, to determine dot products of the estimated pilot symbols and known pilot symbols, to scale the dot products by scaling factors determined based on the SNR estimates, and to combine the scaled dot products to obtain the first phase information.

12. The apparatus of claim 1, wherein the at least one processor is configured to correct phase of the received pilot symbols, to perform detection on phase corrected pilot symbols to obtain estimated pilot symbols, and to sum dot products of the estimated pilot symbols and known pilot symbols to obtain the first phase information.

13. The apparatus of claim 1, wherein the at least one processor is configured to obtain estimated data symbols based upon the received data symbols and to sum dot products of the estimated data symbols and hard decisions for the estimated data symbols to obtain the second phase information.

14. The apparatus of claim 1, wherein the at least one processor is configured to obtain estimated data symbols based upon the received data symbols, to obtain signal-to-noise ratio (SNR) estimates for the second set of subcarriers, to determine dot products of the estimated data symbols and hard decisions for the estimated data symbols, to scale the dot products by scaling factors determined based on the SNR estimates, and to combine the scaled dot products to obtain the second phase information.

15. The apparatus of claim 1, wherein the at least one processor is configured to correct phase of the received data symbols, to perform detection on phase corrected data symbols to obtain estimated data symbols, to obtain hard decisions for the estimated data symbols, and to sum dot products of the estimated data symbols and the hard decisions to obtain the second phase information.

16. The apparatus of claim 1, wherein the at least one processor is configured to adjust timing based upon the first phase information, or the second phase information, or both.

17. The apparatus of claim 1, wherein the at least one processor is configured to estimate frequency error at the apparatus and to correct the frequency error prior to obtaining the first and second phase information.

18. An apparatus comprising:
at least one processor configured to obtain first phase information based upon received pilot symbols from a first set of subcarriers, to obtain second phase information based upon received data symbols from a second set of subcarriers, and to correct phase of the received data symbols based upon the first and second phase information, wherein the at least one processor is configured to determine total timing error based upon the first phase information, or the second phase information, or both, to advance timing if the total timing error exceeds a first value, and to retard timing if the total timing error falls below a second value; and
a memory coupled to the at least one processor.

19. A method comprising:
obtaining, at a wireless communications device, first phase information based upon received pilot symbols from a first set of subcarriers in a current symbol period;
obtaining, at the wireless communications device, second phase information based upon received data symbols from a second set of subcarriers in the current symbol period; and
correcting, by a processor of the wireless communications device, phase of the received data symbols in the current symbol period based upon the first phase information and phase of received data symbols in a subsequent symbol period based upon the second phase information.

20. The method of claim 19, wherein the obtaining the first phase information, obtaining the second phase information, and correcting the phase of the received data symbols comprise
correcting phase of the received pilot symbols,
obtaining the first phase information based upon phase corrected pilot symbols, and
correcting the phase of the received data symbols based upon the first phase information.

21. The method of claim 19, wherein the obtaining the first phase information, obtaining the second phase information, and correcting the phase of the received data symbols comprise
correcting the phase of the received data symbols based upon the first phase information,
performing detection on phase corrected data symbols to obtain estimated data symbols,
obtaining the second phase information based upon the estimated data symbols, and
correcting phase of the estimated data symbols based upon the second phase information.

22. The method of claim 19, wherein the correcting the phase of the received data symbols comprises
combining the first and second phase information to obtain combined phase information, and
correcting the phase of the received data symbols based upon the combined phase information.

23. An apparatus comprising:
means for obtaining first phase information based upon received pilot symbols from a first set of subcarriers in a current symbol period;
means for obtaining second phase information based upon received data symbols from a second set of subcarriers in the current symbol period; and
means for correcting phase of the received data symbols in the current symbol period based upon the first phase information and phase of received data symbols in a subsequent symbol period based upon the second phase information.

24. The apparatus of claim 23, wherein the means for obtaining the first phase information, means for obtaining the second phase information, and means for correcting the phase of the received data symbols comprise
means for correcting phase of the received pilot symbols,
means for obtaining the first phase information based upon phase corrected pilot symbols, and
means for correcting the phase of the received data symbols based upon the first phase information.

25. The apparatus of claim 23, wherein the means for obtaining the first phase information, means for obtaining the second phase information, and means for correcting the phase of the received data symbols comprise
means for correcting the phase of the received data symbols based upon the first phase information,
means for performing detection on phase corrected data symbols to obtain estimated data symbols,
means for obtaining the second phase information based upon the estimated data symbols, and
means for correcting phase of the estimated data symbols based upon the second phase information.

26. The apparatus of claim 23, wherein the means for correcting the phase of the received data symbols comprises
means for combining the first and second phase information to obtain combined phase information, and
means for correcting the phase of the received data symbols based upon the combined phase information.

27. A computer-readable memory having codes stored thereon, the codes being executable by a processor and comprising:
codes for obtaining first phase information based upon received pilot symbols from a first set of subcarriers in a current symbol period;
codes for obtaining second phase information based upon received data symbols from a second set of subcarriers in the current symbol period; and
codes for correcting phase of the received data symbols in the current symbol period based upon the first phase information and phase of received data symbols in a subsequent symbol period based upon the second phase information.

28. The computer-readable memory of claim 27, wherein the codes for obtaining the first phase information, codes for obtaining the second phase information, and codes for correcting the phase of the received data symbols comprise
- codes for correcting phase of the received pilot symbols,
- codes for obtaining the first phase information based upon phase corrected pilot symbols, and
- codes for correcting the phase of the received data symbols based upon the first phase information.

29. The computer-readable memory of claim 27, wherein the codes for obtaining the first phase information, codes for obtaining the second phase information, and codes for correcting the phase of the received data symbols comprise
- codes for correcting the phase of the received data symbols based upon the first phase information,
- codes for performing detection on phase corrected data symbols to obtain estimated data symbols,
- codes for obtaining the second phase information based upon the estimated data symbols, and
- codes for correcting phase of the estimated data symbols based upon the second phase information.

30. The computer-readable memory of claim 27, wherein the codes for correcting the phase of the received data symbols comprises
- codes for combining the first and second phase information to obtain combined phase information, and
- codes for correcting the phase of the received data symbols based upon the combined phase information.

31. A method comprising:
- obtaining, at a wireless communications device, first phase information based upon received pilot symbols from a first set of subcarriers;
- obtaining, at the wireless communications device, second phase information based upon received data symbols from a second set of subcarriers;
- correcting, by a processor of the wireless communications device, phase of the received data symbols based upon the first and second phase information; and
- determining total timing error based upon the first phase information, or the second phase information, or both, to advance timing if the total timing error exceeds a first value, and to retard timing if the total timing error falls below a second value.

32. An apparatus comprising:
- means for obtaining first phase information based upon received pilot symbols from a first set of subcarriers;
- means for obtaining second phase information based upon received data symbols from a second set of subcarriers;
- means for correcting phase of the received data symbols based upon the first and second phase information; and
- means for determining total timing error based upon the first phase information, or the second phase information, or both, to advance timing if the total timing error exceeds a first value, and to retard timing if the total timing error falls below a second value.

33. A computer-readable memory having codes stored thereon, the codes being executable by a processor and comprising:
- codes for obtaining first phase information based upon received pilot symbols from a first set of subcarriers;
- codes for obtaining second phase information based upon received data symbols from a second set of subcarriers;
- codes for correcting phase of the received data symbols based upon the first and second phase information; and
- codes for determining total timing error based upon the first phase information, or the second phase information, or both, to advance timing if the total timing error exceeds a first value, and to retard timing if the total timing error falls below a second value.

* * * * *